June 15, 1926.

C. JABLOW 1,588,582

CROSS EQUALIZER

Filed Feb. 8, 1923

WITNESSES:
R. J. Butler
W. B. Jaspert

INVENTOR
Charles Jablow
BY
Wesley G. Carr
ATTORNEY

Patented June 15, 1926.

1,588,582

UNITED STATES PATENT OFFICE.

CHARLES JABLOW, OF EAST PITTSBURGH, PENNSYLVANIA, ASSIGNOR TO WESTINGHOUSE ELECTRIC & MANUFACTURING COMPANY, A CORPORATION OF PENNSYLVANIA.

CROSS EQUALIZER.

Application filed February 8, 1923. Serial No. 617,716.

My invention relates to railway vehicles, more especially to equalization systems embodied in such vehicles.

It is among the objects of my invention to provide an equalization system for railway vehicles which shall be adapted to efficiently distribute the strain and load incident to their operation to effect proper load distribution on the vehicle-body supports.

It is a further object of this invention to provide such an equalization system which shall be of simple, compact and inexpensive construction and readily adapted for use on standard railway equipment.

The truck of a railway vehicle, such as an electric locomotive, comprises a side-frame construction which is journaled to a wheeled axle in the usual manner and which is provided with a cross-equalization system, through which the truck is loaded from the main frame of the vehicle. Load is applied from the main trucks or frames directly to the center-pin, if possible, but, where interferences, such as the draw-bar works, is encountered, the loading of the center pin must be indirect.

My present invention is directed to an equalization system which is adapted to load the center-pin indirectly through an equalizer beam, my structure being, in effect, a center-pin connection between the bumper frame and the cross equalizer which is extremely flexible and provides an equal load distribution from the center of the bolster to the side or dolphin frames.

Figure 1:
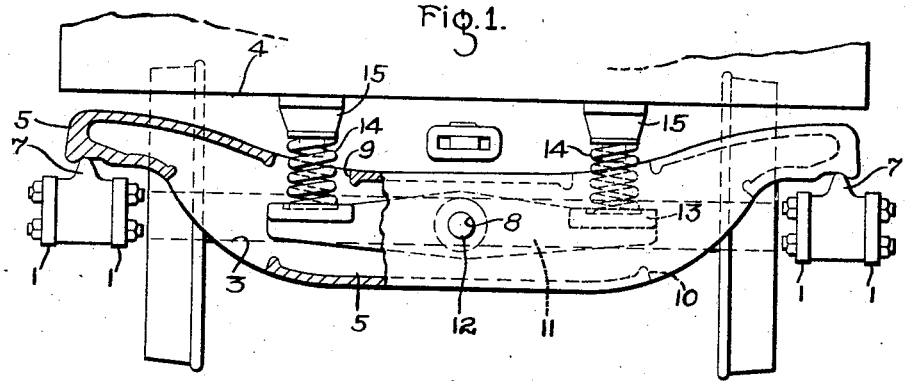
Figure 2:
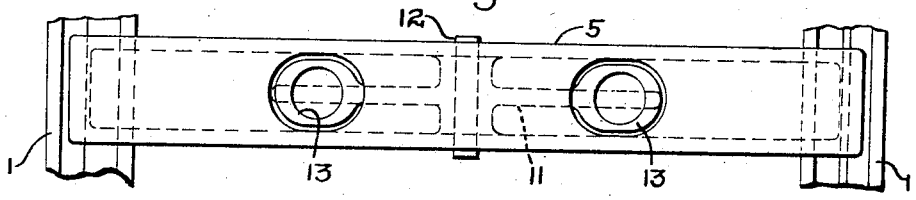

In the accompanying drawing, constituting a part hereof, and in which like reference characters designate like parts, Figure 1 is an end elevational view of a truck embodying the principles of my invention; and Fig. 2 is a plan view of a bolster embodying an improved type of equalizer beam.

As illustrated in Fig. 1, the truck construction comprises a pair of side frames or dolphin beams 1, adapted to co-operate with a pair of journal boxes (not shown), in which a wheeled axle 3 is rotatably supported in the usual manner. The journal boxes are mounted between the pedestal jaws of the vehicle frame 4.

A main cross equalizer 5 is supported at its respective ends, on a support 7, which is secured between the dolphin beams 1. The equalizer 5 is substantially a box-shape structure, having a transverse opening 8 and a plurality of openings 9 and 10. An equalizer beam 11 is inserted through one of the openings 10 and pivotally mounted upon the equalizer frame by a pin 12, extending through the opening 8. The beam 11 is provided with spring seats 13, adapted to receive coil springs 14, which extend through the openings 9 to engage the bosses 15, secured to the underside of the bumper frame 4.

The function of this device is briefly as follows: The loading of the cross equalizer 5 from the vehicle frame 4 is effected through the resilient springs 14, so that load applied to either spring will be distributed equally on the equalizer beam and thus to the center-pin 12, by which it is distributed to the frame of the truck and thence to the axle. In structures of prior types, the yielding spring members were supported directly on the cross-equalizer 5 and, consequently, the load distribution was not equal. This is of primary importance in obtaining proper loading on the center-pin from the vehicle frame.

Although I have described a specific embodiment of my invention, it will be obvious to those skilled in the art that various modifications may be made in the details of construction without departing from the principles herein set forth. For instance, the general construction of the cross equalizer frame and beam and the manner of inserting and securing the latter may be altered in various ways, or the cross equalizer may be suspended from the dolphin beams by links.

I claim as my invention:—

1. In a railway vehicle truck, the combination with a cross equalizer, of an equalizer beam pivotally mounted thereon and a plurality of spring members interposed between said beam and the vehicle frame.

2. In a railway vehicle truck, the combination with a cross equalizer, of an equalizer beam pivotally mounted thereon and a plurality of spring members interposed between said beam and the vehicle frame, said cross equalizer having fulcrum supports at its respective ends which are secured to the dolphin beams of said truck.

3. In a railway vehicle truck, an equalizer system comprising a cross frame supported at its ends on the dolphin beams thereof, an equalizer beam rotatably mounted centrally of said cross beam and resilient means for loading said equalizer beam through the bumper frame of the vehicle.

4. In a railway vehicle truck, an equalizer system comprising substantially a box girder supported at its ends on the dolphin beams thereof, an equalizer beam rotatably mounted centrally of said girder, and resilient means for loading said equalizer beam through the bumper frame of the vehicle, said means comprising a plurality of coil springs interposed between said bumper frame and equalizer beam.

5. In a railway-vehicle truck, an equalizer system comprising a box-girder transversely disposed and supported on the side frames thereof, and an equalizer beam connected by resilient means to a cross-beam of said vehicle to effect loading of the truck frames through a center-pin connection between said equalizer beam and the said box girder.

In testimony whereof, I have hereunto subscribed my name this first day of February, 1923.

CHAS. JABLOW.